United States Patent Office 3,313,824
Patented Apr. 11, 1967

3,313,824
1-SUBSTITUTED - 2 - (AMINOÖXYMETHYL) BENZ-
IMIDAZOLES AND THE CORRESPONDING 2-
ALKYLIDENEAMINOÖXYMETHYL INTERMEDI-
ATES THEREFOR
Leo A. Paquette, Columbus, Ohio, assignor to The Up-
john Company, Kalamazoo, Mich., a corporation of
Delaware
No Drawing. Filed Mar. 13, 1964, Ser. No. 351,835
9 Claims. (Cl. 260—309.2)

This invention relates to novel benzimidazole com-
pounds and to processes for their preparation; particular-
ly to novel 1-alkyl- and 1-phenyl-2-(aminoöxymethyl)
benzimidazoles, 1-alkyl- and 1-phenyl-2-(alkylideneamino-
öxymethyl)benzimidazoles, the acid addition salts there-
of, and to new methods for their preparation.

The novel 1-alkyl- and 1-phenyl-2-(aminoöxymethyl)
benzimidazoles are represented by the structural formula

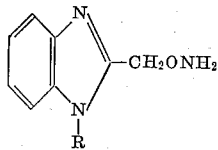

I wherein R is selected from the group consisting of lower
alkyl and phenyl. Examples of lower alkyl are methyl,
ethyl, propyl, butyl, pentyl, hexyl, heptyl and octyl, in-
cluding isomeric forms thereof.

The novel alkylidene compounds, which are inter-
mediates for the preparation of the aminoöxymethyl
compounds (I) delineated in the preceding paragraph,
are represented by the formula

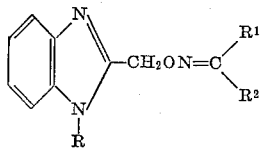

II wherein R has the same meaning as above, $R^1$ is lower
alkyl and $R^2$ is selected from the group consisting of
lower alkyl and hydrogen.

The novel compounds of Formulae I and II exist in
their nonprotonated (free base) or protonated forms de-
pending on the pH of their environments. They form
stable protonates (acid addition salts) on neutralization
with acids, for example, hydrochloric, hydrobromic, sul-
furic, phosphoric, nitric, thiocyanic, fluosilicic, acetic,
benzoic, salicylic, glycolic, succinic, nicotinic, tartaric,
maleic, malic, lactic, methanesulfonic, and cyclohexane-
sulfamic acids and the like. These acid addition salts
are useful in upgrading the free bases. The correspond-
ing free bases are useful as acid acceptors in neutralizing
undesirable acidity or in absorbing an acid as it is formed
in a chemical reaction, for example, a dehydrohalogena-
tion reaction in which hydrogen and chlorine, bromine or
iodine, are removed from vicinal carbon atoms.

The thiocyanic acid addition salts of compounds of
Formulae I and II (i.e., the 1-alkyl- and 1-phenyl-2-
(aminoöxymethyl)benzimidazoles and 1-alkyl- and 1-
phenyl - 2 - (alkylideneaminoöxymethyl)benzimidazoles,
when condensed with formaldehyde, form resinous ma-
terials useful as pickling inhibitors according to U.S.
Patents 2,425,320 and 2,606,155. The fluosilicic acid ad-
dition salts of the compounds of Formulae I and II are
useful as mothproofing agents according to U.S. Patents
1,915,334 and 2,075,359.

The novel 1-alkyl- and 1-phenyl-2-(aminoöxymethyl)
benzimidazoles (I) of the invention can be prepared (in
the form of their acid addition salts) by the acid hydroly-
sis of the corresponding 1-alkyl- and 1-phenyl-2-(alkyl-
ideneaminoöxymethyl)benzimidazoles (II). The hy-
drolysis advantageously is effected with hydrochloric acid,
although other acids, particularly other mineral acids,
e.g., hydrobromic or sulfuric acids, can be used. For ex-
ample, the hydrolytic step can be performed satisfactorily
by steam distillation from hydrochloric acid solution.

The products (I) are recovered from the reaction mix-
ture by conventional procedures; for example, by con-
centration, crystallization from inert solvents, and the
like. The resulting acid addition salts of Formula I can
be converted to their free bases by treatment with an
alkali hydroxide, e.g., aqueous sodium or potassium hy-
droxide, and the liberated free bases can be converted to
other acid addition salts by neutralization with an acid,
for example, any of the acids given above. Acid addi-
tion salts can also be formed by metathesis.

The novel 1-alkyl- and 1-phenyl-2-(alkylideneamino-
öxymethyl)benzimidazoles (II) of the invention are pre-
pared by the reaction of a 1-alkyl- or 1-phenyl-2-halo-
methylbenzimidazole of the formula

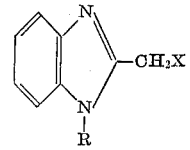

III wherein R has the same meaning as above and X is
halogen, preferably chlorine or bromine, with an alkali
metal salt of an aldoxime or ketoxime of the formula

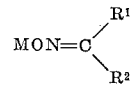

IV wherein $R^1$ and $R^2$ are as given above and M is an alkali
metal, e.g., lithium, sodium, and potassium. Examples
of compounds of Formula IV are the sodium and po-
tassium salts of the oximes of acetaldehyde, propionalde-
hyde, isobutyraldehyde, valeraldehyde, 2-methylbutyral-
dehyde, heptaldehyde, pelargonaldehyde, acetone, diethyl
ketone, methyl n-propyl ketone, diisopropyl ketone, meth-
yl sec.butyl ketone, methyl isohexyl ketone, di-n-pentyl
ketone, methyl neopentyl ketone, ethyl n-heptyl ketone,
di-n-octyl ketone, and the like.

The alkali metal salt (IV) in the form of a dry powder
can be mixed with an inert liquid medium, e.g., an al-
kanol such as methanol, ethanol, propanol, isopropyl al-
cohol, butanol, tert.butyl alcohol and the like, and the
halide (III) is then added to the mixture. Alternatively,
an alkanol solution of an alkali metal alkoxide is pre-
pared, e.g., by adding sodium to methanol, ethanol, or
butanol, or potassium to tert.butyl alcohol, then adding
an aldoxime or ketoxime of the formula

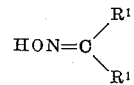

wherein $R^1$ and $R^2$ are as given above, to form the alkali
metal salt (IV) in situ, and finally adding the halide
(III). The reaction can advantageously be carried out
at elevated temperatures (e.g., by heating the reaction
mixture at or near the boiling point), preferably between
about 50° and about 125° C. A heating period of about
two to ten hours is sufficient to effect substantial com-
pletion of the reaction. The products (II) (in the form
of their free bases) are recovered from the reaction mix-
ture by conventional procedures; for example, by con-
centration of the reaction mixture under reduced pres-
sure, followed by extraction with inert solvents (e.g., ethanol, ether, methylene chloride and mixtures thereof), and evaporation of solvent from the extract. The thus produced free bases can be converted to their acid addition salts by neutralization with an acid, for example, any of the acids set forth above. Acid addition salts can also be formed by metathesis. The acid addition salts of the compounds of Formula II can be converted to their corresponding free bases by treatment with alkali hydroxide, e.g., aqueous sodium or potassium hydroxide.

The starting compounds (III) can be prepared by known procedures in accordance with the following reaction sequence:

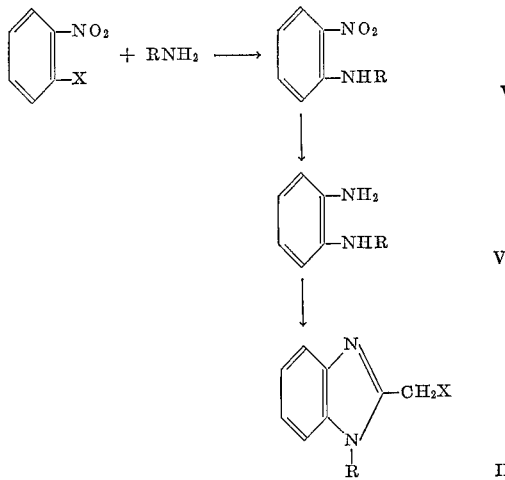

wherein R and X have the same meanings as above. The intermediates represented by Formulae V and VI are prepared in accordance with the method disclosed in J. Amer. Chem. Soc. 76, 1891 (1954); III is prepared in the manner of German Patent 1,078,132. The compounds synthesized in parts A, B and C of Preparation 1, below, are embraced, respectively, by Formulae V, VI and III, above; they are prepared by the methods of the above reaction sequence.

The novel compounds of Formulae I and II, both in their nonprotonated forms and their protonated forms with pharmacologically acceptable acids, for example, hydrochloric, hydrobromic, sulfuric, phosphoric, nitric, acetic, benzoic, salicylic, glycolic, succinic, nicotinic, tartaric, maleic, malic, lactic, methanesulfonic, and cyclohexanesulfamic acids and the like, exhibit pharmacological activity. The compounds of Formulae I and II are central nervous system depressants and are useful for producing sedation in mammals and animals, e.g., mice, rats and birds. The compounds of Formula II, in addition, possess anorexigenic properties; they can be used for reducing and controlling appetite in mammals and animals, e.g., mice, rats and birds.

The novel compounds of Formula I can be used in the preparation of the corresponding anorexigenic guanidines, by reacting the former with 2-methyl-2-thiopseudourea or cyanamide. For example, treating 1-methyl-2-(aminoöxymethyl)benzimidazole with the aforesaid reagents by the methods disclosed in J. Chem. Soc. 963 (1947) for the preparation of 1-alkoxyguanidines, yields 1-methyl-2-(guanidinoöxymethyl)benzimidazole. The fluosilicic acid addition salt of the thus produced compound is useful as a mothproofing agent according to U.S. Patent 2,205,789. 1 - methyl-2-(guanidinoöxymethyl)benzimidazole is also useful as an acid acceptor in neutralizing undesirable acidity or in absorbing an acid as it is formed in a chemical reaction as noted above, particularly when an acid acceptor of greater basicity is desired.

The invention can be more fully understood by the following preparation and example which embody the best manner known for carrying it out.

PREPARATION 1

A. o-nitro-N-methylaniline

A solution of 1000 g. (6.35 moles) of o-chloronitrobenzene and 790 g. (25.4 moles) of methylamine in 1.5 l. of methanol was heated at 150° C. in an autoclave for 6 hours. The methanol was removed under reduced pressure. To the residue 3.5 l. of chloroform was added and the resulting solution was washed with two 1-liter portions of water. The combined water layers were reextracted with 1 liter of chloroform. The combined organic layers were dried and the chloroform was evaporated to give a crude brown-orange product, o-nitro-N-methylaniline.

Following the procedure of part A, but substituting for methylamine:

(a) ethylamine,
(b) n-propylamine,
(c) n-butylamine,
(d) isopentylamine,
(e) 1-methylheptylamine and
(f) aniline, yields, respectively, (a) o-nitro-N-ethylaniline,
(b) o-nitro-N-n-propylaniline,
(c) o-nitro-N-n-butylaniline,
(d) o-nitro-N-isopentylaniline,
(e) o-nitro-N-(1-methylheptyl)aniline and
(f) o-nitro-N-phenylaniline.

B. N-methyl-o-phenylenediamine

The crude o-nitro-N-methylaniline from part A was hydrogenated for 4 hours in the presence of Raney nickel catalyst in ethanol at 35° C. at a pressure of 50 lbs./square inch in an autoclave equipped with a continuous stirrer. The catalyst was removed by filtration and the filtrate was concentrated under reduced pressure. The resulting black oil was distilled in vacuo to give, after a small forerun, 317 g. (40.9% overall yield, based on the starting o-chloronitrobenzene of part A) of colorless liquid N-methyl-o-phenylenediamine with a boiling range of 126 to 130° C. at a pressure of 14 mm. of mercury.

Following the procedure of part B, but substituting for o-nitro-N-methylaniline:

(a) o-nitro-N-ethylaniline,
(b) o-nitro-N-n-propylaniline,
(c) o-nitro-N-n-butylaniline,
(d) o-nitro-N-isopentylaniline,
(e) o-nitro-N-(1-methylheptyl)aniline and
(f) o-nitro-N-phenylaniline, yields, respectively, (a) N-ethyl-o-phenylenediamine,
(b) N-n-propyl-o-phenylenediamine,
(c) N-n-butyl-o-phenylenediamine,
(d) N-isopentyl-o-phenylenediamine,
(e) N-(1-methylheptyl)-o-phenylenediamine and
(f) N-phenyl-o-phenylenediamine.

C. 1-methyl-2-chloromethylbenzimidazole

A solution of 36 g. (0.294 mole) of N-methyl-o-phenylene-diamine from part B and 39 g. (0.413 mole) of chloroacetic acid in 500 ml. of 4 N hydrochloric acid was refluxed for 3 hours. After cooling, the reaction mixture was neutralized with solid sodium bicarbonate and the white solid crude material was filtered and washed thoroughly with water. After complete drying there was obtained 40.5 g. (76.4% yield) of greyish solid product melting at 87 to 91° C. Recrystallization of this material from Skellysolve C (mixture of hexanes and heptanes) gave long white needles of pure 1-methyl-2-chloromethylbenzimidazole, melting at 98 to 99.5° C.

Following the procedure of part C, but substituting for N-methyl-o-phenylenediamine:

(a) N-ethyl-o-phenylenediamine,
(b) N-n-propyl-o-phenylenediamine,
(c) N-n-butyl-o-phenylenediamine,
(d) N-isopentyl-o-phenylenediamine,
(e) N-(1-methylheptyl)-o-phenylenediamine and
(f) N-phenyl-o-phenylenediamine, yields, respectively, (a) 1-ethyl-2-chloromethylbenzimidazole,
(b) 1-n-propyl-2-chloromethylbenzimidazole,
(c) 1-n-butyl-2-chloromethylbenzimidazole,
(d) 1-isopentyl-2-chloromethylbenzimidazole,
(e) 1-(1-methylheptyl)-2-chloromethylbenzimidazole and
(f) 1-phenyl-2-chloromethylbenzimidazole.

EXAMPLE 1

A. *1-methyl-2-(isopropylideneaminoöxymethyl) benzimidazole (II)*

A slurry of 3.8 g. (0.04 mole) of the sodium salt of acetone oxime in 30 ml. of n-butanol was treated with 7.2 g. (0.04 mole) of 1-methyl-2-chloromethylbenzimidazole (prepared in the manner disclosed in part C of Preparation 1). The reaction mixture was stirred at about 25° C. for 0.5 hour and then for 2.5 hours on a steam bath, and then allowed to stand for about 15 hours at about 25° C. The solvent was removed under reduced pressure and the residue was taken up in 200 ml. of ether and 50 ml. of water. After thorough shaking, the layers were separated and the aqueous phase was washed with an additional 100 ml. of ether. The combined organic layers were dried and evaporated to give a gummy yellow solid; crystallization from a mixture of Skellysolve C and benzene employing Darco G–60 (activated carbon) gave 6.2 g. (71.3% yield) of white solid with a melting point of 92 to 97° C. Two recrystallizations from Skellysolve C-benzene gave an analytical sample of 1-methyl-2-(isopropylideneaminoöxymethyl) benzimidazole (II) as fine, white needles melting at 103° C. U.V. $\lambda_{max.}^{EtOH}$ 251 (7,600), 255 (8,000), 269.5 (6,550), 276 (7,450) and 285 m$\mu$ (6,400).

*Analysis.*—Calcd. for $C_{12}H_{15}N_3O$: C, 66.34; H, 6.96; N, 19.34. Found: C, 66.67; H, 6.63; N, 1939.

The hydrochloric, hydrobromic and sulfuric acid addition salts of the above free base, 1-methyl-2-(isopropylideneaminoöxymethyl)benzimidazole, are prepared by adding an ethereal hydrogen chloride, hydrogen bromide or sulfuric acid solution to a solution of the free base in ether. On treatment with sodium or potassium hydroxide, the acid addition salts are converted to the free base form, 1-methyl-2-(isopropylideneaminoöxymethyl)benzimidazole.

Following the procedure of part A, but substituting for 1-methyl-2-chloromethylbenzimidazole:

(a) 1-ethyl-2-chloromethylbenzimidazole,
(b) 1-n-propyl-2-chloromethylbenzimidazole,
(c) 1-isopropyl-2-chloromethylbenzimidazole,
(d) 1-n-butyl-2-chloromethylbenzimidazole,
(e) 1-isopentyl-2-chloromethylbenzimidazole,
(f) 1-(1-methylheptyl)-2-chloromethylbenzimidazole and
(g) 1-phenyl-2-chloromethylbenzimidazole, yields, respectively, (a) 1-ethyl-2-(isopropylideneaminoöxymethyl) benzimidazole,
(b) 1-n-propyl-2-(isopropylideneaminoöxymethyl) benzimidazole,
(c) 1-isopropyl-2-(isopropylideneaminoöxymethyl) benzimidazole,
(d) 1-n-butyl-2-(isopropylideneaminoöxymethyl)benzimidazole,
(e) 1-isopentyl-2-(isopropylideneaminoöxymethyl) benzimidazole,
(f) 1-(1-methylheptyl)-2-(isopropylideneaminoöxymethyl)benzimidazole and
(g) 1-phenyl-2-(isopropylideneaminoöxymethyl)benzimidazole.

Following the procedure of part A, but substituting for the sodium salt of acetone oxime:

(a) the sodium salt of acetaldehyde oxime,
(b) the sodium salt of isobutyraldehyde oxime and
(c) the sodium salt of dioctyl ketone oxime, yields, respectively, (a) 1-methyl-2-(ethylideneaminoöxymethyl)benzimidazole and
(b) 1-methyl-2-(isobutylideneaminoöxymethyl)benzimidazole and
(c) 1-methyl-2-(1-octylnonylideneaminoöxymethyl) benzimidazole.

Following the procedure of part A, but substituting for the sodium salt of acetone oxime and 1-methyl-2-chloromethylbenzimidazole:

(a) the sodium salt of propionaldehyde oxime and 1-ethyl-2-chloromethylbenzimidazole,
(b) the sodium salt of heptaldehyde oxime and 1-n-propyl-2-chloromethylbenzimidazole,
(c) the sodium salt of diethyl ketone oxime and 1-isopropyl-2-chloromethylbenzimidazole,
(d) the sodium salt of diisopropyl ketone oxime and 1-n-butyl-2-chloromethylbenzimidazole,
(e) the sodium salt of methyl sec.butyl ketone oxime and 1-isopentyl-2-chloromethylbenzimidazole,
(f) the sodium salt of methyl neopentyl ketone oxime and 1-(1-methylheptyl)-2-chloromethylbenzimidazole and
(g) the sodium salt of ethyl heptyl ketone oxime and 1-phenyl-2-chloromethylbenzimidazole, yields, respectively, (a) 1-ethyl-2 - (propylideneaminoöxymethyl)benzimidazole,
(b) 1-n-propyl-2 - (heptylideneaminoöxymethyl)benzimidazole,
(c) 1-isopropyl-2 - (1-ethylpropylideneaminoöxymethyl) benzimidazole,
(d) 1-n-butyl-2 - (1-isopropyl-2-methylpropylideneaminoöxymethyl)benzimidazole,
(e) 1-isopentyl - 2 - (1,2 - dimethylbutylideneaminoöxymethyl)benzimidazole,
(f) 1-(1-methylheptyl) - 2 - (1,3,3-trimethylbutylideneaminoöxymethyl)benzimidazole and
(g) 1 - phenyl-2 - (1 - ethyloctylideneaminoöxymethyl) benzimidazole.

B. *1-methyl-2-(aminoöxymethyl)benzimidazole dihydrochloride (I)*

A solution of 11.7 g. (0.054 mole) of 1-methyl-2-(isopropylideneaminoöxymethyl)benzimidazole (II) (from part A) in 75 ml. of 6 N hydrochloric acid was steam distilled for 2 hours. The solution was concentrated, 50 ml. of absolute ethanol was added and the resulting solution was evaporated to dryness to give a pale yellow solid. This material was recrystallized from ethanol-ether to give 11.6 g. of product which melted at 127 to 132° C. with evolution of gas. Fractional crystallization of this material from ethanol and ethanol-ether gave two products. Eight recrystallizations of sample A (the more insoluble fraction) from 95% ethanol gave a minor amount of fine white crystals of 1-methyl-2-(aminoöxymethyl) benzimidazole monohydrochloride (I) with a melting point of 141° C. with prior sintering at 132° C.

*Analysis.*—Calcd. for $C_9H_{11}N_3O \cdot HCl$: C, 50.59; H, 5.66; Cl, 16.60; N, 19.66. Found: C, 51.02; H, 5.37; Cl, 16.36; N, 19.30.

Four recrystallizations of sample B (the more soluble fraction) from ethanol-ether gave fluffy white needles of 1-methyl - 2 - (aminoöxymethyl)benzimidazole dihydrochloride (I), melting at 127 to 128° C. with evolution of gas.

*Analysis.*—Calcd. for $C_9H_{11}N_3O \cdot 2HCl$: C, 43.22; H, 5.24; N, 16.80. Found: C, 42.95; H, 5.43; N, 16.80.

On treatment of either the mono- or dihydrochloride with sodium hydroxide or potassium hydroxide, the free base form, 1-methyl-2- aminoöxymethyl)benzimidazole, is obtained.

Following the procedure of part B, but substituting for hydrochloric acid another acid, e.g., hydrobromic or sulfuric acid, gives the corresponding acid addition salt of 1-methyl-2-(aminoöxymethyl)benzimidazole.

Following the procedure of part B, but substituting for 1-methyl-2 - (isopropylideneaminoöxymethyl)benzimidazole:

(a) 1-ethyl-2 - (propylideneaminoöxymethyl)benzimidazole,
(b) 1-n-propyl-2 - (heptylideneaminoöxymethyl)benzimidazole,
(c) 1-isopropyl-2 - (1-ethylpropylideneaminoöxymethyl)benzimidazole,
(d) 1-n-butyl-2 - (1-isopropyl-2-methylpropylideneaminoöxymethyl)benzimidazole,
(e) 1 - isopentyl-2 - (1,2 - dimethylbutylideneaminoöxymethyl)benzimidazole,
(f) 1-(1-methylheptyl) - 2 - (1,3,3-trimethylbutylideneaminoöxymethyl)benzimidazole and
(g) 1-phenyl - 2 - (1 - ethyloctylideneaminoöxymethyl)benzimidazole, yields, respectively, the hydrochlorides of (a) 1-ethyl-2-(aminoöxymethyl)benzimidazole,
(b) 1-n-propyl-2-(aminoöxymethyl)benzimidazole,
(c) 1-isopropyl-2-(aminoöxymethyl)benzimidazole,
(d) 1-n-butyl-2-(aminoöxymethyl)benzimidazole,
(e) 1-isopentyl-2-(aminoöxymethyl)benzimidazole,
(f) 1-(1-methylheptyl)-2 - (aminoöxymethyl)benzimidazole and
(g) 1-phenyl-2-(aminoöxymethyl)benzimidazole.

I claim:
1. A compound selected from the group consisting of (1) a 1-substituted-2-(alkylideneaminoöxymethyl)benzimidazole of the formula

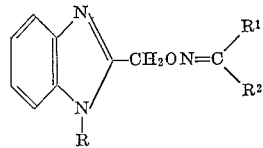

wherein R is selected from the group consisting of lower alkyl and phenyl, $R^1$ is lower alkyl and $R^2$ is selected from the group consisting of lower alkyl and hydrogen, and (2) an acid addition salt thereof.

2. 1-methyl - 2 - (isopropylideneaminoöxymethyl)benzimidazole.
3. An acid addition salt of 1-methyl-2-(isopropylideneaminoöxymethyl)benzimidazole.
4. 1-methyl-2 - (isopropylideneaminoöxymethyl)benzimidazole hydrochloride.
5. A compound selected from the group consisting of (1) a 1-substituted-2-(aminoöxymethyl)benzimidazole of the formula

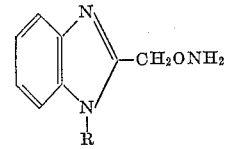

wherein R is selected from the group consisting of lower alkyl and phenyl, and (2) an acid addition salt thereof.
6. 1-methyl-2-(aminoöxymethyl)benzimidazole.
7. An acid addition salt of 1-methyl-2-(aminoöxymethyl)benzimidazole.
8. 1-methyl-2-(aminoöxymethyl)benzimidazole monohydrochloride.
9. 1-methyl-2 - (aminoöxymethyl)benzimidazole dihydrochloride.

References Cited by the Examiner

UNITED STATES PATENTS 3,060,177  10/1962  Druey et al. _____ 260—566
3,207,787  9/1965   Levy _____ 260—566

OTHER REFERENCES

Janny: Berichte, vol. 16, pages 170–77 (1883).
Noller: Chemistry of Organic Compounds, 2nd ed., page 210, Philadelphia, Saunders, 1957.
Shriner: Organic Syntheses, vol. 27, pages 15–18 (1947).

WALTER A. MODANCE, *Primary Examiner.*
NATALIE TROUSOF, *Assistant Examiner.*